(12) United States Patent
Kotha et al.

(10) Patent No.: US 9,021,116 B2
(45) Date of Patent: Apr. 28, 2015

(54) SYSTEM AND METHOD TO CREATE VIRTUAL LINKS FOR END-TO-END VIRTUALIZATION

(75) Inventors: Saikrishna Kotha, Austin, TX (US); Gaurav Chawla, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 848 days.

(21) Appl. No.: 12/853,883

(22) Filed: Aug. 10, 2010

(65) Prior Publication Data
US 2012/0042095 A1    Feb. 16, 2012

(51) Int. Cl.
| | |
|---|---|
| G06F 9/455 | (2006.01) |
| G06F 15/16 | (2006.01) |
| G06F 15/173 | (2006.01) |
| H04L 12/28 | (2006.01) |
| H04L 12/66 | (2006.01) |
| H04L 12/54 | (2013.01) |
| G06F 11/14 | (2006.01) |
| H04L 29/06 | (2006.01) |

(52) U.S. Cl.
CPC ............ H04L 12/56 (2013.01); *H04L 29/0653* (2013.01); G06F 11/1423 (2013.01); *H04L 29/06* (2013.01); *Y02B 60/43* (2013.01)

(58) Field of Classification Search
CPC ................ H04L 29/06; H04L 29/0653; H04L 2012/6443; H04L 2012/5624; G06F 11/1423
USPC .......... 370/409, 352, 397, 399; 709/238, 239, 709/240
See application file for complete search history.

(56) References Cited

U.S. PATENT DOCUMENTS

| | | | | |
|---|---|---|---|---|
| 7,596,151 | B2 * | 9/2009 | Kim .............................. | 370/468 |
| 7,733,795 | B2 * | 6/2010 | Johnson et al. ............... | 370/252 |
| 7,912,091 | B1 * | 3/2011 | Krishnan et al. ............. | 370/490 |
| 7,970,938 | B1 * | 6/2011 | Lambeth et al. ............. | 709/245 |
| 2008/0288664 | A1 | 11/2008 | Pettey et al. | |
| 2010/0097926 | A1 * | 4/2010 | Huang et al. .................. | 370/219 |
| 2010/0303075 | A1 * | 12/2010 | Tripathi et al. ............... | 370/392 |
| 2011/0134793 | A1 * | 6/2011 | Elsen et al. ................... | 370/254 |
| 2011/0228767 | A1 * | 9/2011 | Singla et al. .................. | 370/389 |
| 2012/0182866 | A1 * | 7/2012 | Vinayagam et al. .......... | 370/228 |

OTHER PUBLICATIONS

Wadekar, Manoh, Priority Grouping for DCB networks, Enhanced Transmission Selection", http://www.ieee802.org/1/files/public/docs2008/az-wadekar-ets-proposal-0608-v1.01.pdf", pp. 1-9.*

* cited by examiner

*Primary Examiner* — Aftab Nasir Khan
(74) *Attorney, Agent, or Firm* — Larson Newman, LLP

(57) ABSTRACT

An information handling system includes a network switching device coupled to a network and a host processing system. The network switching device includes a physical link with an associated virtual link. The host processing system includes a virtual machine and a network interface device coupled to the physical link. The network interface device includes a virtual network interface associated with the virtual machine. The virtual link is associated with the virtual network interface such that communication between the network and the virtual machine is provided via the virtual link and the virtual network interface.

13 Claims, 6 Drawing Sheets

US 9,021,116 B2

SYSTEM AND METHOD TO CREATE VIRTUAL LINKS FOR END-TO-END VIRTUALIZATION

FIELD OF THE DISCLOSURE

This disclosure relates generally to information handling systems, and relates more particularly to virtual links for end-to-end virtualization in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
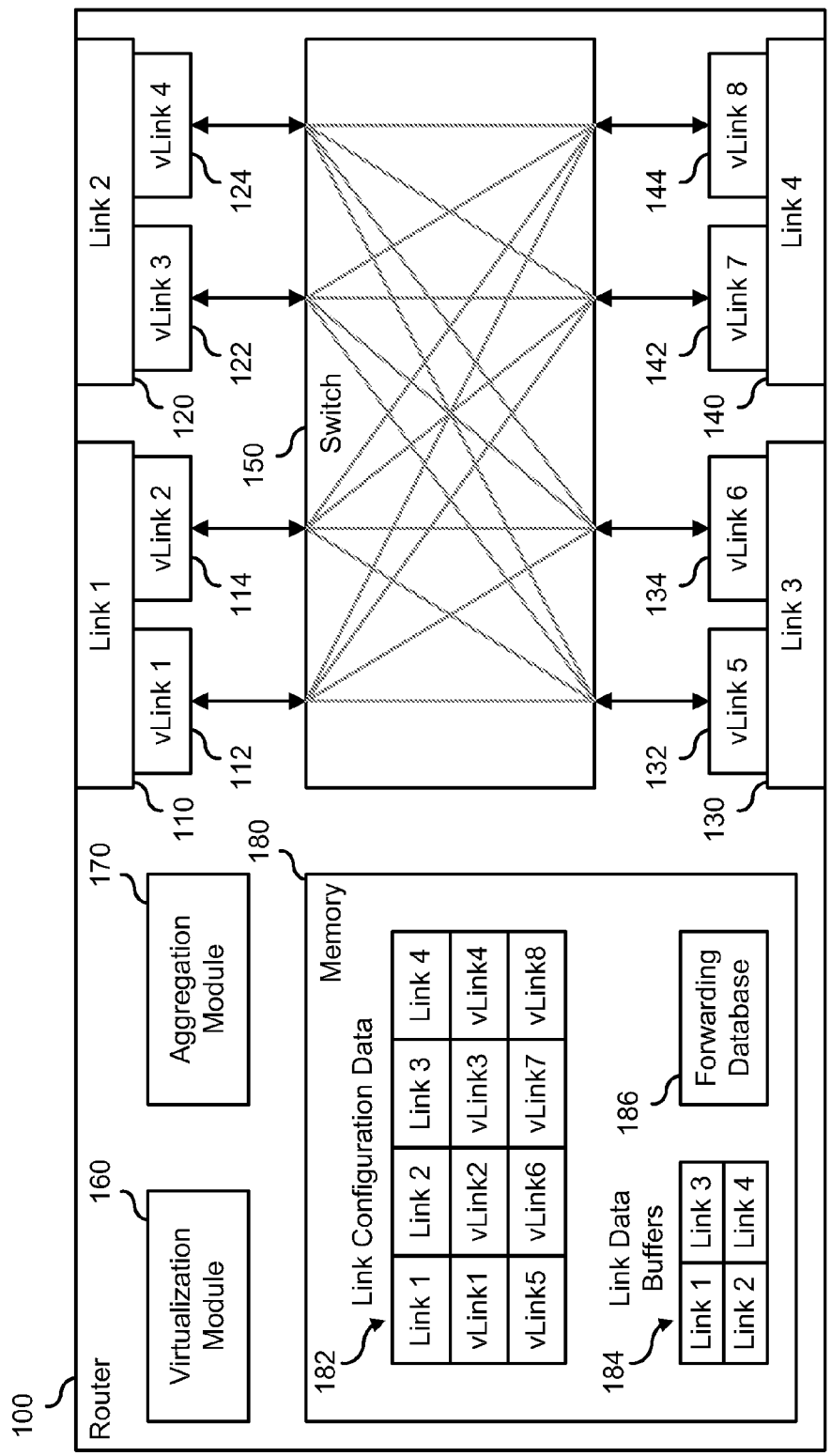
FIG. 1 is a functional block diagram of a network router according to an embodiment of the present disclosure.

FIG. 1 illustrates a network router 100 for use in an information handling system. For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Network router 100 includes physical links 110, 120, 130, and 140, a switch 150, a virtualization module 160, a link aggregation module 170, and a memory 180. Physical link 110 includes a first virtual link 112 and one or more additional virtual links 114. Similarly physical links 120, 130, and 140 each include first virtual links 122, 132, and 142, respectively, and each include one or more additional virtual link 124, 134, and 144, respectively. Memory 180 includes link configuration data 182, link data buffers 184, and a forwarding database (FDB) 186. Router 100 operates to interconnect computing devices by receiving data packets from a device connected to one link and selectively forwarding the data packets to a device connected to another link, based upon source and destination address information included in the data packets. For example, upon receiving a data packet on physical link 120 that has a destination address associated with a device that is connected to physical link 140, router 100 can direct switch 150 to forward the data packet from physical link 120 to physical link 140.

Router 100 directs packets based upon routing information included in forwarding database 186. In a particular embodiment, forwarding database 186 is implemented as a routing information base (RIB) that routes packets based upon source and destination Internet Protocol (IP) addresses that are associated with the internet layer protocol. In another embodiment, forwarding database 186 is implemented as a forwarding information base (FIB) that routes data packets based upon source and destination Media Access Control (MAC) addresses that are associated with the link layer protocol. As router 100 receives data packets that include a particular source MAC address on a particular port, forwarding base 186 is maintained to associate the particular MAC address with the particular link. Then, when a data packet is received with the particular MAC address as the destination, switch 150 will direct the data packet to the associated link.

Physical links 110, 120, 130, and 140 each include associated link configuration data 182 that defines the parameters of the physical links. For example, physical links 110, 120, 130, and 140 can be configured to operate at different link data rates, to have different maximum data packet sizes or maximum transmission units (MTUs), to operate using different data protocols such as Fibre Channel on Ethernet (FCoE), or to have other configuration parameters as needed or desired. Physical links 110, 120, 130, and 140 each include an associated link data buffer 184 that permits queuing and prioritization of the data packets that are received and forwarded by the physical links. In a particular embodiment, router 100 is an Ethernet router that functions in accordance with the IEEE 802.3 Local Area Network (LAN) standards. In another embodiment, physical links 110, 120, 130, and 140 have configurable link data rates and router 100 is an energy efficient Ethernet router in accordance with the IEEE 802.3az standard.

Router 100 further operates to provide one or more virtual links 112, 114, 122, 124, 132, 134, 142, and 144 that are associated with physical links 110, 120, 130, and 140. Virtualization module 160 establishes virtual links 112, 114, 122, 124, 132, 134, 142, and 144 and provides link configuration data 182 for each of the virtual links, and associates the virtual links with particular routing behavior in forwarding database 186. In this way, each physical link 110, 120, 130, and 140 is divided into one or more virtual link 112, 114, 122, 124, 132, 134, 142, and 144. Link configuration data for virtual links 112, 114, 122, 124, 132, 134, 142, and 144 can be the same as the associated physical links 110, 120, 130, and 140, or can be different. For example, where physical link 110 is configured as a 10 giga-bit per second (Gbps) link, virtual link 112 can be configured as a 10 Gbps link and virtual link 114 can be configured as a 100 mega-bit per second (Mbps) link, or both virtual links 112 and 114 can be configured as 5 Gbps links. In another example, physical link 130 and virtual link 132 can be configured with an MTU size of 4500 bytes to accommodate jumbo frames, while virtual link 134 can be configured with an MTU size of 1500 bytes to accommodate standard frames. In yet another example, virtual link 122 can be configured with a lower quality of service level than virtual link 124, thus ensuring that data packets routed on virtual link 124 are prioritized over data packets routed on virtual link 122.

In the illustrated embodiment, virtual links 112, 114, 122, 114, 132, 134, 142, and 144 that are associated with a common physical link 110, 120, 130, and 140 share the associated physical link's link data buffer 184. In another embodiment (not illustrated), link data buffers 184 for each physical link 110, 120, 130, and 140 are apportioned such that a portion of the link data buffer for each physical link is allocated to the associated virtual links 112, 114, 122, 124, 132, 134, 142, and 144 as needed or desired. For example, the link data buffer for physical port 120 can be apportioned such that virtual link 122 is allocated 60% of the link data buffer and virtual link 124 is allocated 40% of the link data buffer. In yet another embodiment (not illustrated), link data buffers 184 for each physical link 110, 120, 130, and 140 remain dedicated to the physical links, and separate link data buffers (not illustrated) are created for virtual links 112, 114, 122, 124, 132, 134, 142, and 144. Note that a particular physical link can have one or more associated virtual links, or can have no associated virtual links as needed or desired.

In a particular embodiment, virtualization module 160 is manually configured to establish virtual links 112, 114, 122, 124, 132, 134, 142, and 144 by a system administrator as needed or desired. In another embodiment, virtualization module 160 establishes virtual links 112, 114, 122, 124, 132, 134, 142, and 144 in response to receiving a Link Layer Discovery Protocol (LLDP) Protocol Data Unit (PDU), as described below. For example, a system administrator can provide one or more LLDP PDUs from a host system to virtualization module 160 as needed or desired. In another example, a network interface card (NIC) or a converged network adapter (CNA) on a host system can automatically generate one or more LLDP PDU to be sent to virtualization module 160.

Aggregation module 170 provides for the aggregation of physical links 110, 120, 130, and 140 and virtual links 112, 114, 122, 124, 132, 134, 142, and 144 to increase the effective data packet throughput to a computing device (not illustrated) that is connected to two or more of the physical links or virtual links or to provide redundant data paths between router 100 and the computing device. Thus two or more physical links 110, 120, 130, or 140, two or more virtual links 112, 114, 122, 124, 132, 134, 142, or 144, or a combination thereof can be configured as a single logical link. In a particular embodiment, link aggregation is performed in conformance to the IEEE 802.3ad standard or the IEEE 802.1AX standard.

Figure 2:
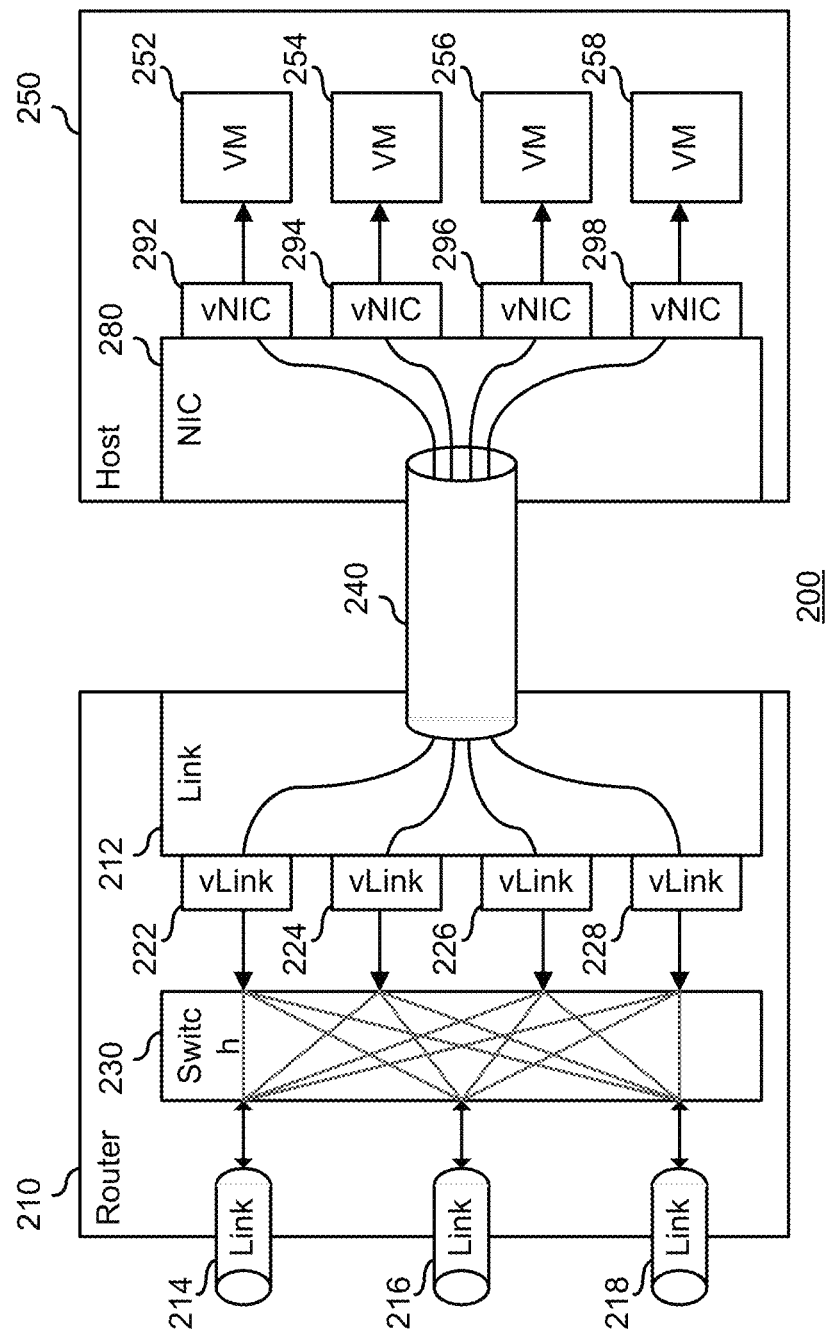
FIG. 2 is a functional block diagram illustrating an embodiment of a network including a network router similar to the network router of FIG. 1.

FIG. 2 illustrates a network 200 according to an embodiment of the present disclosure, including a router 210 similar to router 100, a network fabric 240, and a host system 250. Router 210 includes physical links 212, 214, 216, and 218 and switch 230. Physical link 212 includes virtual links 222, 224, 226, and 228. In a particular embodiment (not illustrated), one or more of physical links 214, 216, and 218 include one or more virtual links. Switch 230 is similar to switch 150, directing data packets from a source link to a destination link. Router 210 also includes a virtualization module (not illustrated) similar to virtualization module 160, an aggregation module (not illustrated) similar to aggregation module 170, and a memory (not illustrated) similar to memory 180 and including link configuration data, link data buffers, and a forwarding database.

Host system 250 includes virtual machines 252, 254, 256, and 258 and a NIC 280. Each virtual machine 252, 254, 256, and 258 is associated with one or more virtual NIC 292, 294, 296, and 298, respectively. Virtual NICs 292, 294, 296, and 298 share the data communication capabilities of NIC 280, and each virtual NIC has a unique MAC address. In this way, the data communication capabilities of NIC 280 are shared among virtual machines 252, 254, 256, and 258. Host system 250 includes a virtual machine hypervisor (not illustrated) that creates virtual machines 252, 254, 256, and 258, creates virtual NICs 292, 294, 296, and 298, and establishes the association between the virtual machines and the virtual NICs. Network fabric 240 provides a common physical connection between link 212 and NIC 280 for communication of data packets between host system 250 and other computing devices (not illustrated) that are connected to links 214, 216, and 218. A non-limiting example of network fabric 240 includes an Ethernet fabric, a Fibre Channel fabric, or another network communication fabric. In a particular embodiment, the functions of NIC 280 are included in a CNA.

In a particular embodiment, each virtual link 222, 224, 226, and 228 is associated with virtual NICs 292, 294, 296, and 298, respectively. For example, data packets from virtual machine 252 are sent to virtual NIC 292, are communicated from NIC 280 to link 212 via network fabric 240, are received by virtual link 222, and are forwarded through switch 230 to the appropriate link 214, 216, or 218 as directed by the forwarding database. Similarly, data packets that are received by link 214, 216, or 218 that include virtual machine 252 as the destination address are forwarded through switch 230 to virtual link 222, are communicated from link 212 to NIC 280 via network fabric 240, are received by NIC 280, and are directed through virtual NIC 292 to virtual machine 252. In a particular embodiment, the link configuration data for virtual links 222, 224, 226, and 228 are set to match the configurations for virtual NICs 292, 294, 296, and 298, respectively. For example, NIC 280 can have a maximum link data rate of 10 Gbps that is partitioned such that virtual NIC 294 is allocated a maximum link data rate of 5 Gbps, and then virtual link 224 will also have a maximum link data rate of 5 Gbps. In another embodiment, the link configuration data for virtual links 222, 224, 226, and 228 are set differently than the configurations for virtual NICs 292, 294, 296, and 298, respectively, as needed or desired. For example, virtual NIC 298 can have a one priority setting for outgoing data packets and virtual link 228 can have a different priority setting for incoming data packets. In this way, traffic policies and virtual NIC and virtual link configurations are consistently applied across network 200. Further, in another embodiment, each data packet is tagged with an identifying marker that is associated with the appropriate virtual link. Thus data packets sent from virtual machines 252, 254, 256, and 258 are tagged by NIC 280, and the tags are removed by router 210. Likewise data packets sent to virtual machines 252, 254, 256, and 258 are tagged by router 210, and the tags are removed by NIC 280.

In a particular embodiment (not illustrated), a virtualized link structure associated with a physical link is also created on one or more of the other physical links. Then, if the computing devices connected to other physical links include similar virtualization capabilities, an end-to-end virtualized link structure is created. For example, if physical link 216 is connected to another router similar to router 210, which in turn is connected to a storage area network that includes virtualized storage, the virtualized structure established in host system 250 can be maintained all the way from the host system to the storage area network. Here, the tags applied to each data packet at the source are maintained through the network, and will not be removed until the data packet reaches the last virtual link. In another embodiment (not illustrated), different virtualized link structures are applied at different links and in different routers, as needed or desired.

Figure 3:
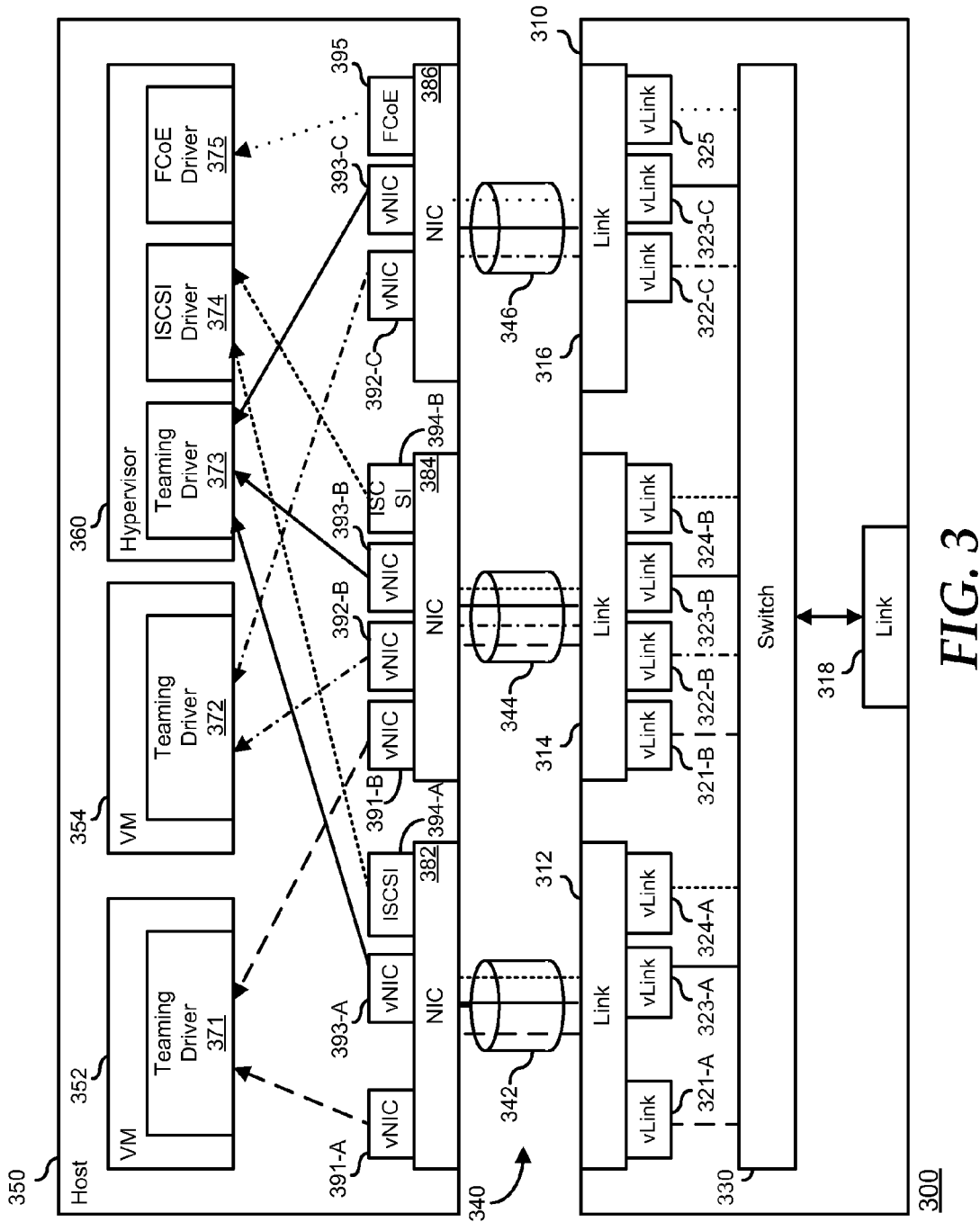
FIG. 3 is a functional block diagram illustrating another embodiment of a network including a network router similar to the network router of FIG. 1.

FIG. 3 illustrates a network 300 according to an embodiment of the present disclosure, including a router 310 similar to router 100, a switched fabric 340, and a host system 350. Router 310 includes physical links 312, 314, 316, and 318 and switch 330. Switch 330 is similar to switch 150, directing data packets from a source link to a destination link. Router 310 also includes a virtualization module (not illustrated) similar to virtualization module 160, an aggregation module (not illustrated) similar to aggregation module 170, and a memory (not illustrated) similar to memory 180 and including link configuration data, link data buffers, and a forwarding database. Physical link 312 includes virtual links 321-A, 323-A, and 324-A, physical link 314 includes virtual links 321-B, 322-B, 323-B, and 324-B, and physical link 316 includes virtual links 322-C, 323-C, and 325. The relation of the virtual links to host system 350 will be described below.

Host system 350 includes virtual machines 352 and 354, virtual machine hypervisor 360, and NICs 382, 384, and 386. Virtual machine 352 includes a teaming NIC driver 371 and virtual machine 354 includes a teaming NIC driver 372. Virtual machine hypervisor 360 includes a teaming NIC driver 373, an Internet Small Computer System Interface (ISCSI) driver 374, and a Fibre Channel on Ethernet (FCoE) driver 374. Teaming drivers 371, 372, and 373, ISCSI driver 374, and FCoE driver 375 create virtual NICs on NICs 382, 384, and 386, based upon the data rate or channel redundancy needed by the associated virtual machines 352 and 354, and by virtual machine hypervisor 360. Thus teaming driver 371 is associated with a virtual NIC 391-A on NIC 282 and a virtual NIC 391-B on NIC 384, teaming driver 372 is associated with a virtual NIC 392-B on NIC 284 and a virtual NIC 392C on NIC 386, teaming driver 373 is associated with a virtual NIC 393-A on NIC 282, a virtual NIC 393-B on NIC 384, and a virtual NIC 393-C on NIC 386, ISCSI driver 374 is associated with a virtual NIC 394-A on NIC 282 and a virtual NIC 394-B on NIC 384, and FCoE driver 375 is associated with a virtual NIC 395 on NIC 286. In this way, virtual machine 352 shares the data communication capabilities of NICs 382 and 384 via virtual NICs 391-A and 391-B. Similarly virtual machine 354 and virtual machine hypervisor 360 share the data capacity of NICs 382, 384, and 386. Drivers 371 through 375 assign unique MAC addresses to the associated virtual NICs. Switched fabric 340 provides common physical connections between router 310 and host system 350, and includes network fabric 342 that connects link 312 and NIC 382, network fabric 344 that connects link 314 and NIC 384, and network fabric 346 that connects link 316 and NIC 386.

In a particular embodiment, virtual links 321-A and 321-B are aggregated by a link aggregation module (not illustrated) in router 310, and are associated with virtual NICs 391-A and 391-B, respectively, virtual links 322-B and 322-C are aggregated and associated with virtual NICs 392-B and 392-C, respectively, virtual links 323-A, 323-B, and 323-C are aggregated and associated with virtual NICs 393-A, 393-B, and 392-C, respectively, virtual links 324-A and 324-B are aggregated and associated with virtual NICs 394-A and 394-B, respectively, and virtual link 325 is associated with virtual NIC 395. Here, when a data packet is sent from virtual machines 352 and 354 and from virtual machine hypervisor 360, drivers 371 through 375 choose from among the associated virtual NICs a particular virtual NIC to which to send the data packet. In a particular embodiment, drivers 371 through 375 determine which virtual NIC to choose based upon the data communication load on the associated physical NICs 382, 384, and 386, and send the data packet to the virtual NIC on the least loaded physical NIC. For example, a data packet from virtual machine 352 can be provided to teaming driver 371 which determines which of physical NICs 382 and 384 is least loaded. If physical NIC 384 is chosen, then teaming driver 371 sends the data packet to virtual NIC 391-B to be communicated from NIC 384 to link 314 via network fabric 344. The data packet is received by virtual link 321-B and is forwarded through switch 330 to the appropriate link 318 as directed by the forwarding database. Similarly, data packets that are received by link 318 that include virtual machine 352 as the destination address are forwarded through switch 330 to either of virtual links 321-A or 321-B based upon the data communication load on physical links 312 and 314, are communicated from the selected physical link to the associated virtual NIC 391-A or 391-B, and are directed to virtual machine 352. In a particular embodiment, the link configuration data for the virtual links and the virtual NICs are set to provide consistent traffic policies across network 300. In a particular embodiment (not illustrated), a virtualized link structure associated with a physical link is also created on one or more of the other physical links. Then, if the computing devices connected to other physical links include similar virtualization capabilities, an end-to-end virtualized link structure are created. In another embodiment (not illustrated), different virtualized link structures are applied at different links and in different routers, as needed or desired.

In a particular embodiment, router 310 is manually configured to establish virtual links 321-A, 321-B, 322-B, 322-C, 323-A, 322-B, 323-C, 324-A, 324-B, and 325 by a system administrator as needed or desired. In another embodiment, the virtualization module establishes the virtual links in response to receiving an LLDP PDU, as described below. For example, a system administrator can provide one or more LLDP PDUs from host system 350 to the virtualization module as needed or desired. In another example, one or more of NICs 382, 384, and 386 automatically generates one or more LLDP PDU to be sent to the virtualization module.

Figure 4:
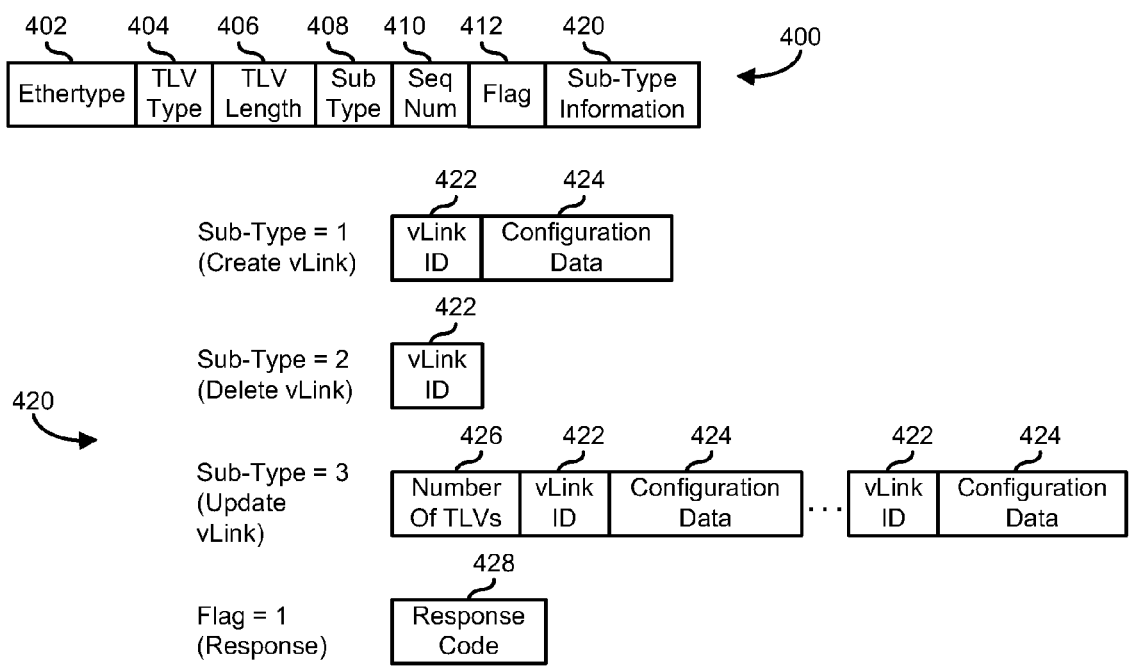
FIG. 4 is a view of an Ethernet frame for a Link Layer Discovery Protocol-Protocol Data Unit transaction according to an embodiment of the present disclosure.

FIG. 4 illustrates an embodiment of an Ethernet frame 400 for an LLDP PDU transaction. Frame 400 includes an Ethertype field 402, a type-length-value (TLV) type field 404, a TLV length field 406, a sub-type field 408, a sequence number field 410, a flag field 412 and a sub-type information field 420. TLV type field 404 includes a unique value that indicates that frame 400 is for configuring virtual link structures in a network device. TLV length field 406 provides an indication of the length of frame 400. Sub-type field 408 identifies the operation to be performed in response to receiving frame 400, as illustrated in Table 1. For example, if sub-type field 408 has the value of "1," then the targeted receiver of frame 400 is to create a new virtual link, if the sub-type field has the value of "2," the receiver is to delete an existing virtual link, and if the sub-type field has the value of "3," the receiver is to update the configuration data and policies of one or more virtual links. Sequence number field 410 includes a unique value supplied in a request frame that is also included in the associated response frame to identify that the response information is associated with the identified request frame. Flag field 412 identifies a particular frame 400 as either a request frame or a response frame. For example, a value of "0" can identify the frame as a request frame, while a value of "1" can identify the frame as a response frame. In a particular embodiment (not illustrated), an Ethernet frame similar to Ethernet frame 400 does not include a flag field. Rather, the indication that the frame is a response frame is identified using a different value in the sub-type field. For example, a sub-type field value of "4" can indicate that the frame is a response frame.

TABLE 1

LLDP PDU Sub-Type

| Value | Sub-Type |
|---|---|
| 1 | Create a virtual link |
| 2 | Delete a virtual link |
| 3 | Update virtual link policies |

Sub-type information field 420 includes different information for the different request sub-type frames and for the response frame. When sub-type field 408 has the value of "1," then frame 400 is a create-virtual-link frame and sub-type information 420 includes a virtual link identifier field 422, and a configuration data field 424. When sub-type field 408 has the value of "2," then frame 400 is a delete-virtual-link frame and sub-type information 420 includes a virtual link identifier field 422. When sub-type field 408 has the value of "3," then frame 400 is an update-virtual-link frame and sub-type information 420 includes a number-of-TLVs field 426 and one or more virtual link identifier field 422 with a corresponding configuration data field 424. When flag field 412 has the value of "1," then frame 400 is a response frame and sub-type information 420 includes a response code field 428. Virtual link identifier field 422 provides an identification of the virtual link that is to be created, deleted, or updated. Configuration data 242 includes the information that specifies the configuration data and traffic policies to be applied to the identified virtual link that is created with or updated to. Number-of-TLVs field 426 identifies the number of virtual links that are to be updated in response to receiving the frame. The number identified in number-of-TLVs field 426 will correspond with the number of virtual link identifier fields 422 and configuration data fields 424. Response code field 428 includes a coded response to the request frame that indicates if the request was successfully performed, if the request was partially performed, if the request failed, and the reason that the request was either partially performed or failed.

Figure 5:
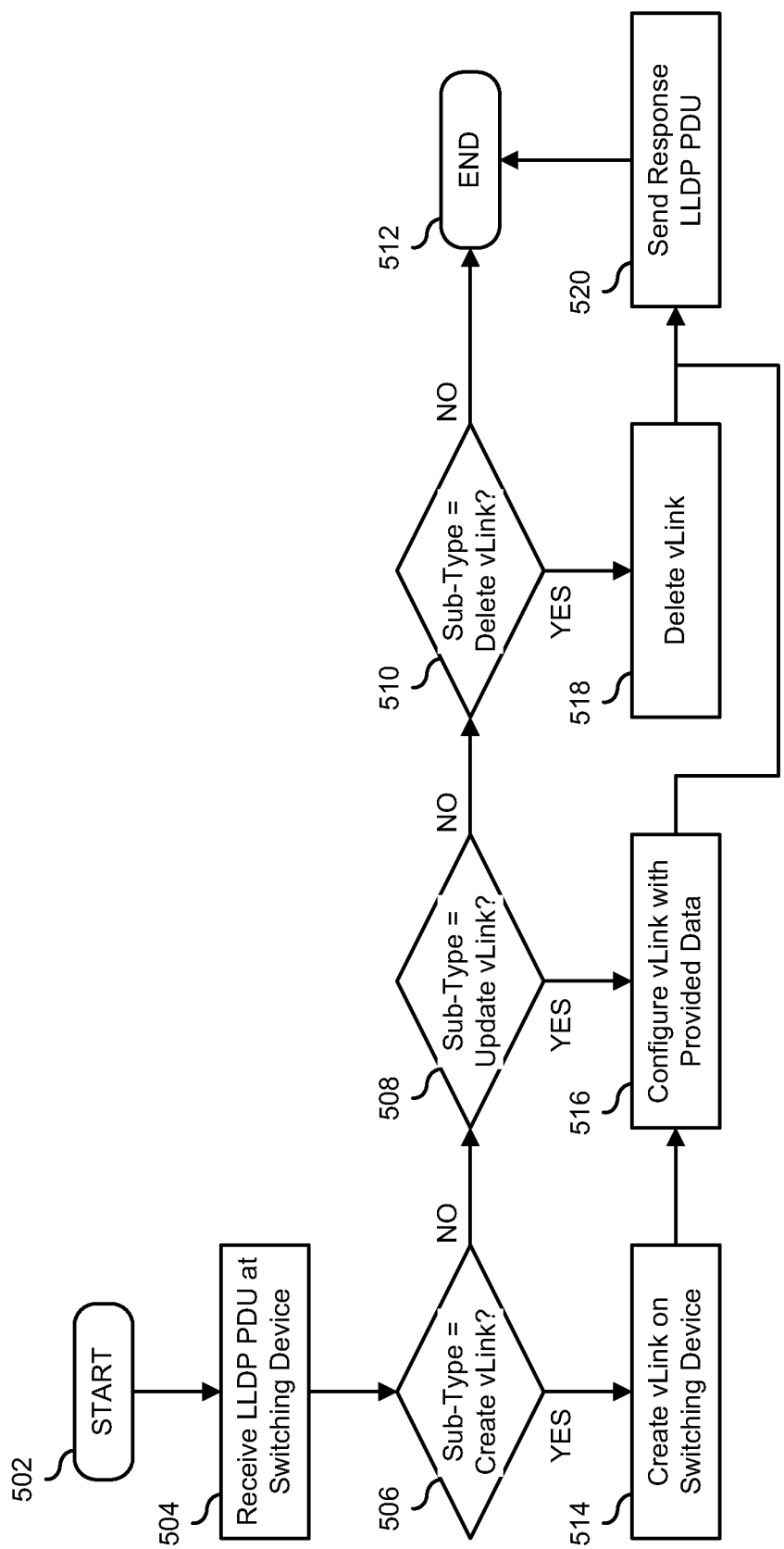
FIG. 5 is a flowchart illustrating a method for enabling virtual links for end-to-end virtualization in a network.

FIG. 5 illustrates a method for enabling virtual links for end-to-end virtualization in a network similar to the networks described in FIGS. 2 and 3. The method starts in block 502. An LLDP PDU is received at a switching device in block 504. For example, NIC 382 can be embodied as a CNA that automatically detects changes in the number of virtual NICs 391-A, 393-A, and 394-A, or in the configuration of one or more of the virtual NICs, and automatically send an LLDP PDU to router 310 to create, delete, or update one or more of virtual links 321-A, 323-A, or 324-A. A decision is made as to whether or not the LLDP PDU is a create-virtual-link frame in decision block 506. If so, the "YES" branch of decision block 506 is taken, the virtual link is created on the switching device in block 514, the new virtual link is configured with the configuration data provided in the LLDP PDU in block 416, a response PDU is sent back to the requester describing the success or failure to create the virtual link in block 520, and the method ends in block 512. If the LLDP PDU is not a create-virtual-link frame, the "NO" branch of decision block 506 is taken, and a decision is made as to whether or not the LLDP PDU is an update-virtual-link frame in decision block 508. If so, the "YES" branch of decision block 508 is taken, the specified virtual link is updated with the configuration data provided in the LLDP PDU in block 416, a response PDU is sent back to the requester describing the success or failure to update the virtual link in block 520, and the method ends in block 512. If the LLDP PDU is not an update-virtual-link frame, the "NO" branch of decision block 508 is taken, and a decision is made as to whether or not the LLDP PDU is a delete-virtual-link frame in decision block 510. If so, the "YES" branch of decision block 510 is taken, the specified virtual link is deleted in block 518, a response PDU is sent back to the requester describing the success or failure to delete the virtual link in block 520, and the method ends in block 512. If the LLDP PDU is not a delete-virtual-link frame, the "NO" branch of decision block 510 is taken and the method ends in block 512.

Figure 6:
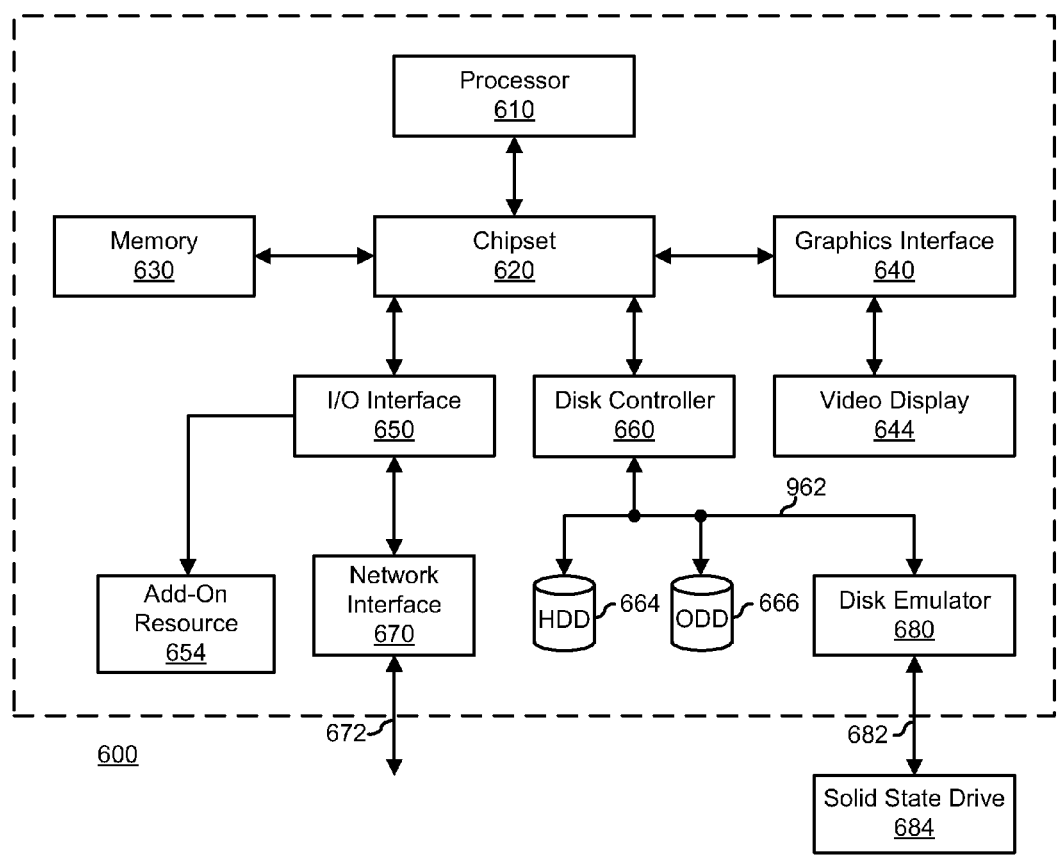
FIG. 6 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 6 illustrates a functional block diagram of an embodiment of an information handling system, generally designated as 600. Information handling system 600 includes processor 610, a chipset 620, a memory 630, a graphics interface 640, an input/output (I/O) interface 650, a disk controller 660, a network interface 670, and a disk emulator 680.

Processor 610 is coupled to chipset 620. Chipset 620 supports processor 610, allowing processor 610 to process machine-executable code. In a particular embodiment (not illustrated), information handling system 600 includes one or more additional processors, and chipset 620 supports the multiple processors, allowing for simultaneous processing by each of the processors, permitting the exchange of information between the processors and the other elements of information handling system 600. Processor 610 can be coupled to chipset 620 via a unique channel, or via a bus that shares information between processor 610, chipset 620, and other elements of information handling system 600.

Memory 630 is coupled to chipset 620. Memory 630 can be coupled to chipset 620 via a unique channel, or via a bus that shares information between chipset 620, memory 630, and other elements of information handling system 600. In particular, a bus can share information between processor 610, chipset 620 and memory 630. In a particular embodiment (not illustrated), processor 610 is coupled to memory 630 through a unique channel. In accordance with another aspect (not illustrated), an information handling system can include a separate memory dedicated to each of the processors. A non-limiting example of memory 630 includes static, dynamic. Or non-volatile random access memory (SRAM, DRAM, or NVRAM), read only memory (ROM), flash memory, another type of memory, or any combination thereof.

Graphics interface 640 is coupled to chipset 620. Graphics interface 640 can be coupled to chipset 620 via a unique channel, or via a bus that shares information between chipset 620, graphics interface 640, and other elements of information handling system 600. Graphics interface 640 is coupled to a video display 644. Other graphics interfaces (not illustrated) can also be used in addition to graphics interface 640 if needed or desired. Video display 644 can include one or more types of video displays, such as a flat panel display or other type of display device.

I/O interface 650 is coupled to chipset 620. I/O interface 650 can be coupled to chipset 620 via a unique channel, or via a bus that shares information between chipset 620, I/O interface 650, and other elements of information handling system 600. Other I/O interfaces (not illustrated) can also be used in addition to I/O interface 650 if needed or desired. I/O interface 650 is coupled to one or more add-on resources 654. Add-on resource 654 can also include another data storage system, a graphics interface, a network interface card (NIC), a sound/video processing card, another suitable add-on resource or any combination thereof.

Network interface device 670 is coupled to I/O interface 650. Network interface 670 can be coupled to I/O interface 650 via a unique channel, or via a bus that shares information between I/O interface 650, network interface 670, and other elements of information handling system 600. Other network interfaces (not illustrated) can also be used in addition to network interface 670 if needed or desired. Network interface 670 can be a network interface card (NIC) disposed within information handling system 600, on a main circuit board (e.g., a baseboard, a motherboard, or any combination thereof), integrated onto another component such as chipset 620, in another suitable location, or any combination thereof. Network interface 670 includes a network channel 672 that provide interfaces between information handling system 600 and other devices (not illustrated) that are external to information handling system 600. Network interface 670 can also include additional network channels (not illustrated).

Disk controller 660 is coupled to chipset 610. Disk controller 660 can be coupled to chipset 620 via a unique channel, or via a bus that shares information between chipset 620, disk controller 660, and other elements of information handling system 600. Other disk controllers (not illustrated) can also be used in addition to disk controller 660 if needed or desired.

Disk controller 660 can include a disk interface 662. Disk controller 660 can be coupled to one or more disk drives via disk interface 662. Such disk drives include a hard disk drive (HDD) 664 or an optical disk drive (ODD) 666 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 660 can be coupled to disk emulator 680. Disk emulator 680 can permit a solid-state drive 684 to be coupled to information handling system 600 via an external interface. The external interface can include industry standard busses (e.g., USB or IEEE 1384 (Firewire)) or proprietary busses, or any combination thereof. Alternatively, solid-state drive 684 can be disposed within information handling system 600.

In a particular embodiment, HDD 644, ODD 666, solid state drive 684, or a combination thereof include a computer-readable medium in which one or more sets of machine-executable instructions such as software, can be embedded. For example, the instructions can embody one or more of the methods or logic as described herein. In a particular embodiment, the instructions reside completely, or at least partially, within memory 630, and/or within processor 610 during execution by information handling system 600. Memory 630 and processor 610 can also include computer-readable media.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system for implementing end-to-end virtualization, the information handling system comprising:
   a first network router including:
      a forwarding database that routes data packets based upon a media access control (MAC) address of a source virtual machine and a MAC address of a destination virtual machine;
      a first link configuration data; and
      a first physical link that includes a first link data buffer that permits queuing and prioritization of data packets forwarded by the first physical link and that is associated in the first link configuration data with a first virtual link and a second virtual link of the first network router, wherein the first link data buffer is apportioned such that the first virtual link is allotted a first percentage of the first link data buffer and the second virtual link is allotted a second percentage of the first link data buffer, and wherein the first network router is coupled to a network and
   a host processing system including:
      a plurality of virtual machines including a first virtual machine and a second virtual machine; and
      a first network interface device coupled to the first physical link of the first network router, the first network interface device including a first virtual network interface (virtual NIC) associated with the first virtual machine and a second virtual NIC associated with the second virtual machine;
   wherein data packets that are communicated between the network and the first virtual machine are tagged with a first identifying marker that associates the first virtual link with the first virtual NIC;
   wherein data packets that are communicated between the network and the second virtual machine are tagged with a second identifying marker that associates the second virtual link with the second virtual NIC;
   wherein the host processing system configures a virtual link structure comprising the first virtual link and the second virtual link, wherein in configuring the virtual link structure, the host processing system sends to the first network router a first Link Layer Discovery Protocol (LLDP) Protocol Data Unit (PDU) frame to establish the first virtual link and to associate the first virtual link with the first physical link in the first link configuration data; and
   wherein the LLDP PDU frame is operable in a first mode to create a new virtual link, in a second mode to delete an exiting virtual link, and in a third mode to update configuration data and policies of the existing virtual link.

2. The information handling system of claim 1, wherein further:
   the first network router includes a second physical link, the second physical link being associated in the first link configuration data with a third virtual link;
   the information handling system further comprising a second network router coupled to the network and including a third physical link coupled to the second physical link, the third physical link being associated in a second link configuration data of the second network router with a fourth virtual link; and
   the first identifying marker associates the fourth virtual link with the third virtual link, the first virtual link, and the first virtual NIC such that communication between the network and the first virtual machine is provided via the fourth virtual link, the third virtual link, the first virtual link, and the first virtual NIC.

3. The information handling system of claim 1, wherein each of the first link configuration data and the second link configuration data are set differently than the configurations for each of the first virtual NIC and the second virtual NIC, wherein the first and second virtual NICs have a one priority setting for outgoing data packets and the virtual links have a different priority setting for incoming data packets such that traffic policies for each of the first and second virtual NICs and each of the first and second virtual link configurations are consistently applied across network.

4. The information handling system of claim 1, wherein further:
   the first network router includes a second physical link, the second physical link being associated in the first link configuration data with a third virtual link;
   the host processing system includes a second network interface device coupled to the second physical link, the second network interface device including a third virtual NIC associated with the first virtual machine; and
   the first identifying marker associates the third virtual link with the third virtual NIC.

5. The information handling system of claim 4, wherein at least one of the first virtual link, the second virtual link, or the third virtual link is created on the first network router in response to the first network router receiving a LLDP PDU data packet.

6. The information handling system of claim 5, wherein the LLDP PDU data packet is automatically generated in a converged network adapter in the host processing system.

7. A method, comprising:
   providing a host processing system with:
      a first virtual machine;
      a first virtual network interface (virtual NIC) associated with a first network interface device of the host processing system and with the first virtual machine, wherein the first network interface device is coupled to a first physical link;
      a second virtual machine; and
      a second virtual NIC associated with the first network interface device and with the second virtual machine;
   establishing, by the host processing system, a virtual link structure on a first network router that is coupled to a network, wherein in establishing the virtual link structure, the method further comprises:
      sending to the first network router a first Link Layer Discovery Protocol (LLDP) Protocol Data Unit (PDU) frame to establish a first virtual link and to associate the first virtual link with the first physical link of the first network router in a first link configuration data of the first network router, wherein the first LLDP PDU frame is operable in a first mode to create a new virtual link, in a second mode to delete an exiting virtual link, and in a third mode to update configuration data and policies of the existing virtual link; and
      sending to the first network router a second LLDP PDU to establish a second virtual link and to associate the second virtual link with the first physical link in the first link configuration data, wherein the first physical link includes a first link data buffer that permits queuing and prioritization of data packets forwarded by the first physical link and that is associated in the first link configuration data with the first virtual link and the second virtual link of the first network router, wherein the first link data buffer is apportioned such that the first virtual link is allotted a first percentage of the first link data buffer and the second virtual link is allotted a second percentage of the first link data buffer;

associating, by the host processing system, the first virtual link with the first virtual NIC such that communication between the network and the first virtual machine is provided via the first virtual link and the first virtual NIC, wherein associating the first virtual link with the first virtual NIC comprises tagging data packets communicated between the first virtual link and the first virtual NIC with a first identifying marker;

associating, by the host processing system, the second virtual link with the second virtual NIC such that communication between the network and the second virtual machine is provided via the second virtual link and the second virtual NIC, wherein associating the second virtual link with the second virtual NIC comprises tagging data packets communicated between the second virtual link and the second virtual NIC with a second identifying marker; and forwarding, by the first network router, data packets based upon a media access control (MAC) address of a source virtual machine and a MAC address of a destination virtual machine.

8. The method of claim 7, further comprising:
sending to the first network router a third PDU to establish a third virtual link and to associate the third virtual link with a third physical link of the first network router in the first link configuration data;
sending to a second network router that is coupled to the network with a fourth PDU to establish a fourth virtual link and to associate the fourth virtual link with a fourth physical link of the second network router in a second link configuration data of the second network router; and
associating the fourth virtual link with the third virtual link, the first virtual link, and the first virtual NIC such that communication between the network and the first virtual machine is provided via the fourth virtual link, the third virtual link, the first virtual link and the first virtual NIC, wherein the first identifying marker associates the fourth virtual link with the third virtual link, the first virtual link, and the first virtual NIC.

9. The method of claim 7, further comprising:
providing that each of the first link configuration data and the second link configuration data are set differently than the configurations for each of the first and second virtual NICs, wherein the first and second virtual NICs have one priority setting for outgoing data packets and the first and second virtual links have a different priority setting for incoming data packets such that traffic policies for each of the first and second virtual NICs and each of the first and second virtual link configurations are consistently applied across network.

10. The method of claim 7, wherein further:
sending to the first network router a third LLDP PDU to establish and to associate the third virtual link with a second physical link of the first network router in the first link configuration data;
providing the host processing system with a third virtual NIC associated with a second network interface device of the host processing system and with the first virtual machine, wherein the second network interface device is coupled to the second physical link, wherein the first identifying marker associates the third virtual link with the third virtual NIC.

11. The method of claim 10, wherein the third LLDP PDU is a LLDP PDU data packet.

12. The method of claim 11, wherein the third LLDP PDU data packet is automatically generated in a converged network adapter in the host processing system.

13. Machine-executable code for an information handling system, wherein the machine-executable code is embedded within a non-transitory medium and includes instructions for carrying out a method, the method comprising:
providing a host processing system with:
a first virtual machine;
a first virtual network interface (virtual NIC) associated with a first network interface device of the host processing system and with the first virtual machine, wherein the first network interface device is coupled to the first physical link;
a second virtual machine; and
a second virtual NIC associated with the first network interface device and with the second virtual machine;
establishing, by the host processing system, a virtual link structure on a first network router that is coupled to a network, wherein in establishing the virtual link structure, the method further comprises:
sending to the first network router a first Link Layer Discovery Protocol (LLDP) Protocol Data Unit (PDU) frame to establish a first virtual link and to associate the first virtual link with a first physical link of the first network router in a first link configuration data of the first network router, wherein the first LLDP PDU frame is operable in a first mode to create a new virtual link, in a second mode to delete an exiting virtual link, and in a third mode to update configuration data and policies of the existing virtual link; and
sending to the first network router a second LLDP PDU to establish a second virtual link and to associate the second virtual link with the first physical link in the first link configuration data, wherein the first physical link includes a first link data buffer that permits queuing and prioritization of data packets forwarded by the first physical link and that is associated in the first link configuration data with the first virtual link and the second virtual link of the first network router, wherein the first link data buffer is apportioned such that the first virtual link is allotted a first percentage of the first link data buffer and the second virtual link is allotted a second percentage of the first link data buffer;
associating, by the host processing system, the first virtual link with the first virtual NIC such that communication between the network and the first virtual machine is provided via the first virtual link and the first virtual NIC, wherein associating the first virtual link with the first virtual NIC comprises tagging data packets communicated between the first virtual link and the first virtual NIC with a first identifying marker;
associating, by the host processing system, the second virtual link with the second virtual NIC such that communication between the network and the second virtual machine is provided via the second virtual link and the second virtual NIC, wherein associating the second virtual link with the second virtual network interface comprises tagging data packets communicated between the second virtual link and the second virtual NIC with a second identifying marker; and
forwarding, by the first network router, data packets based upon a media access control (MAC) address of a source virtual machine and a MAC address of a destination virtual machine.

* * * * *